(12) United States Patent
Kim

(10) Patent No.: US 6,488,299 B2
(45) Date of Patent: Dec. 3, 2002

(54) TRAILING ARM MOUNTING STRUCTURE

(75) Inventor: Seon-Pyung Kim, Suwon (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 10/028,138

(22) Filed: Dec. 20, 2001

(65) Prior Publication Data

US 2002/0043779 A1 Apr. 18, 2002

(30) Foreign Application Priority Data

Dec. 30, 2000 (KR) .................................... 2000-0086959

(51) Int. Cl.$^7$ ................................................. B60G 3/14
(52) U.S. Cl. .......................... 280/124.128; 280/124.13; 280/124.133
(58) Field of Search ................... 280/124.128, 124.129, 280/124.127, 124.13, 124.132, 124.133, 124.148, 124.153

(56) References Cited

U.S. PATENT DOCUMENTS

| | | | | |
|---|---|---|---|---|
| 3,173,707 A | * | 3/1965 | Peras | .................. 280/124.128 |
| 3,216,740 A | * | 11/1965 | Peras | ..................... 280/124.13 |
| 3,694,000 A | * | 9/1972 | Van Winsen | ......... 280/124.128 |

* cited by examiner

Primary Examiner—Eric Culbreth
(74) Attorney, Agent, or Firm—Pennie & Edmonds LLP

(57) ABSTRACT

A trailing arm mounting structure is provided, in which rear wheels follow a path approximating a straight line, which forms a predetermined acute angle with the road surface to the rear of the vehicle, during bump and rebound of the vehicle body such that shock in forward and rear directions transmitted from the road is reduced and space provided for the backseat and fuel tank is increased. In the trailing arm mounting structure, a first end of a trailing arm is connected to a rear wheel and a second end of the trailing arm is connected to a vehicle body with a concoid curve-forming assembly interposed therebetween.

6 Claims, 2 Drawing Sheets

Front ←

TRAILING ARM MOUNTING STRUCTURE

BACKGROUND OF THE INVENTION

The present invention relates to a trailing-type rear wheel suspension system, and more particularly, to a trailing arm mounting structure, in which rear wheels follow a path approximating rectilinear motion in an upward/rearward and downward/forward direction during bump and rebound of the vehicle body.

In a trailing-type rear wheel suspension system, one end of a trailing arm is connected to a rear wheel and its other end is mounted to a vehicle body. Accordingly, during bump and rebound of the vehicle body, the rear wheel connected to the trailing arm follows a path drawn upwardly and downwardly about a mounting point of the trailing arm, that is, the point at which the trailing arm is mounted to the vehicle body. During rebound in an upward direction of the vehicle body, the rear wheels move according to a downward/forward path, and during bump in a downward direction of the vehicle body, the rear wheels move according to an upward/forward path.

However, as a result of the forward motion of the rear wheels during bump of the vehicle body, shock received from the road in the forward and rear direction is directly transmitted to the vehicle body. Also, such a path of the rear wheels reduces the amount of space available for the back seat as well as for the fuel tank.

SUMMARY OF THE INVENTION

According to the present invention, a trailing arm mounting structure is provided, in which the rear wheels follow a path approximating a straight line, which forms a predetermined acute angle with the road surface to the rear of the vehicle. During bump and rebound of the vehicle body shock in forward and rearward directions transmitted from the road is thereby reduced and space provided for the backseat and fuel tank is increased.

In a preferred embodiment of the present invention, a first end of the trailing arm is connected to a rear wheel and a second end of the trailing arm is connected to the vehicle body with a concoid curve-forming assembly interposed therebetween. The concoid curve-forming assembly preferably comprises a link, interposed between the vehicle body and the second end of the trailing arm, and a bushing, connected to the vehicle body and the trailing arm at a distance spaced from the second end of the trailing arm sufficient to permit concoid motion of the vehicle body and of the trailing arm. The bushing enables the second end of the trailing arm to form a concoid curve during operation of the trailing arm mounting structure. The bushing provides an axis about which the trailing arm pivots and enables the trailing arm to move in a direction of its long axis.

The link preferably comprises a first mounting point, where the link is connected to the vehicle body, and a second mounting point, where the link is connected to the second end of the trailing arm. The second mounting point is most preferably at an extreme end of the trailing arm, and the first mounting point is at a predetermined distance from the second mounting point.

BRIEF DESCRIPTION OF THE DRAWINGS

The accompanying drawings, which are incorporated in and constitute a part of the specification, illustrate an embodiment of the invention, and, together with the description, serve to explain the principles of the invention.

DETAILED DESCRIPTION OF THE PREFERRED EMBODIMENTS

Figure 1:
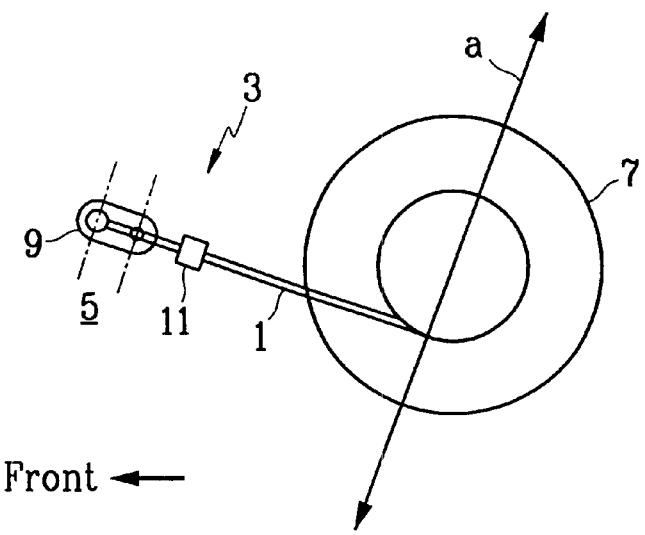
FIG. 1 is schematic side view of a trailing arm mounting structure according to a preferred embodiment of the present invention.

Preferred embodiments of the present invention will now be described in detail with reference to the accompanying drawings.

A trailing arm mounting structure according to the invention includes a trailing arm 1 and a concoid curve-forming assembly 3. Reference numeral 5 indicates a vehicle body. A rear wheel 7 is supported by a shock absorber (not shown) and a suspension spring (not shown), both of which are connected to one end of the trailing arm 1. The vehicle body 5 is connected to the other end of the trailing arm 1 (hereinafter referred to as the vehicle body end of the trailing arm 1), and the concoid curve-forming assembly 3 includes components provided on the vehicle body end of the trailing arm 1 and supporting the trailing arm 1 at a position that is spaced apart from the vehicle body end of the trailing arm 1.

Figure 2:
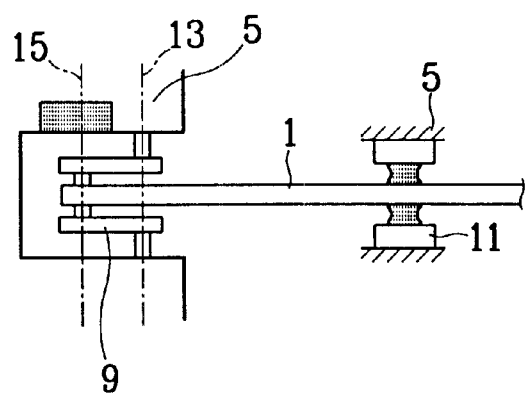
FIG. 2 is a plan view of the trailing arm mounting structure of FIG. 1.

The concoid curve-forming assembly 3 operates such that the vehicle body end of the trailing arm 1 follows a concoid curve when the vehicle body 7 undergoes bump and rebound. As a result, the rear wheel 7 follows a path (a) approximating a straight line that has a predetermined angle to the road surface. That is, the path (a) forms an acute angle with the road surface to the rear of the vehicle such that the path (a) is drawn upwardly and to the rear and downwardly and forward ('forward' and 'rear' being in reference to the forward arrow in the drawing). Various configurations may be used to realize this operation of the concoid curve forming assembly 3. In a preferred embodiment, referring also to FIG. 2, the concoid curve-forming assembly 3 includes a link 9 and a bushing 11. The link 9 is interposed between the vehicle body 5 and the trailing arm 1 at the vehicle body end thereof.

The link 9 includes first and second mounting points 13 and 15. The link 9 is connected to the vehicle body 5 at the first mounting point 13, and the vehicle body end of the trailing arm 1 is connected to the link 9 at the second mounting point 15. As shown in the drawing, the second mounting point 15 is at an extreme end of the vehicle body end of the trailing arm 1, and the first mounting point 13 is spaced apart from the second mounting point 15 a distance sufficient to permit concoid motion of the vehicle body end of the trailing arm 1, i.e., the end traces a concoid curve during operation.

The bushing 11 is connected to the vehicle body 5, and to the trailing arm 1 at a predetermined distance from the vehicle body end of the trailing arm 1. The bushing 11 forms a moving axis about which the trailing arm 1 pivots. That is, when the rear wheel 7 follows path (a), the trailing arm 1 pivots about the bushing 11 and also moves in a long axis direction thereof.

Figure 3:
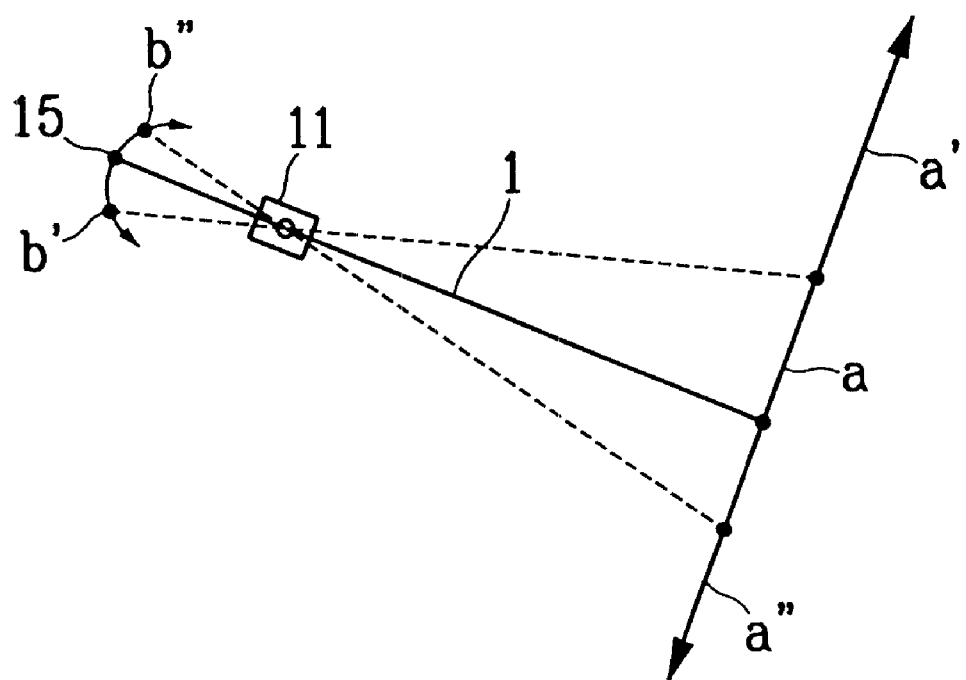
FIG. 3 is a diagramatic view illustrating operation of the trailing arm of FIG. 1.

Operation of the trailing arm assembly structured as in the above during bump and rebound will now be described with reference also to FIG. 3.

During rebound of the vehicle body 5, the rear wheel 7 moves along a downward portion (a") of the path (a).

Accordingly, the trailing arm 1 pivots about the bushing 11 such that the wheel end follows the path of the wheel 7 while the vehicle body end (or the second mounting point 15) follows an upward path (b"). As a result of the link 9, the second mounting point 15 forms a concoid curve. That is, the trailing arm 1 pivots about the bushing 11, and simultaneously moves along its long axis direction in a rearward direction (opposite the front arrow of FIG. 1). Therefore, the rear wheel 7 follows the path (a) that approximates a straight line.

The opposite operation occurs during bump of the vehicle body 5. That is, during bump of the vehicle body 5, the rear wheel moves along an upward portion (a') of the path (a). Accordingly, the trailing arm 1 pivots about the bushing 11 such that the wheel end follows the path of the wheel 7 while the vehicle body end (or the second mounting point 15) follows a downward path (b'). As a result of the link 9, the second mounting point 15 forms a concoid curve. That is, the trailing arm 1 pivots about the bushing 11, and simultaneously moves along its long axis direction in a rearward direction (opposite the forward arrow of FIG. 1). Therefore, the rear wheel 7 follows the path (a) that approximates a straight line.

Since the trailing arm is mounted to the vehicle body through the concoid curve-forming assembly, the path of the rear wheel during bump and rebound of the vehicle body approximates a straight line that forms a predetermined acute angle with the road surface to the rear of the vehicle. As a result, shock in forward and rear directions transmitted from the road is reduced and space provided for the backseat and fuel tank is increased.

Although preferred embodiments of the present invention have been described in detail hereinabove, it should be clearly understood that many variations and/or modifications of the basic inventive concepts herein taught which may appear to those skilled in the present art will still fall within the spirit and scope of the present invention, as defined in the appended claims.

What is claimed is:

1. A trailing arm mounting structure, in which a first end of a trailing arm is connected to a rear wheel and a second end of the trailing arm is connected to a vehicle body with a concoid curve-forming assembly interposed therebetween such that the rear wheel follows a path in approximately a straight line during bump and rebound of the vehicle body, the path forming a predetermined acute angle with a road surface to the rear of the vehicle.

2. The trailing arm mounting structure of claim 1, wherein the concoid curve-forming assembly comprises:

a link interposed between the vehicle body and the second end of the trailing arm; and a bushing connected to the vehicle body and the trailing arm at a point spaced from the second end of the trailing arm a distance sufficient to enable the second end of the trailing arm to trace a concoid curve during operation of the trailing arm mounting structure.

3. The trailing arm mounting structure of claim 2, wherein the link comprises:

a first mounting point where the link is connected to the vehicle body; and a second mounting point where the link is connected to the second end of the trailing arm, the second mounting point being at an extreme end of the trailing arm, and the first mounting point being at a predetermined distance from the second mounting point.

4. The trailing arm mounting structure of claim 2, wherein the bushing provides an axis about which the trailing arm pivots and enables the trailing arm to move in a direction of its long axis.

5. A trailing arm mounting structure for attachment to a vehicle body, comprising:

a trailing arm having a first end and a second end, wherein a rear wheel of the vehicle is connected proximate to the first end;

a link rotatably coupled between the second end of said trailing arm and the vehicle body;

a bushing disposed between said first and second ends of said trailing arm mounted on the vehicle body, said bushing providing a sliding pivot point such that the second end of the trailing arm follows a concoid path causing said rear wheel of said vehicle to follow approximately a straight line path that forms an acute angle with a road surface during bump and rebound of the vehicle.

6. The trailing arm mounting structure of claim 5, wherein said link defines a first mounting point rotatably coupled to the vehicle body and a second mounting point rotatably coupled to said second end of said trailing arm, wherein said first mounting point is spaced from the second mounting point in a direction towards said bushing.

* * * * *